No. 743,335. PATENTED NOV. 3, 1903.
J. J. ROGERS.
PUNCH AND LACING AWL.
APPLICATION FILED MAR. 4, 1903.
NO MODEL.
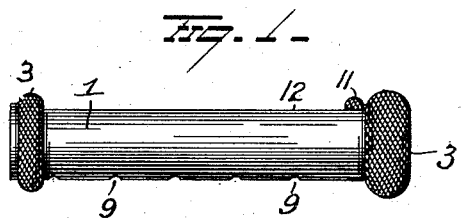
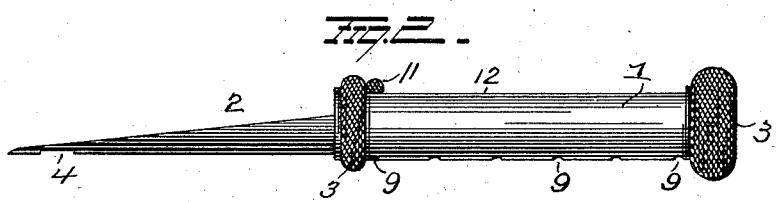
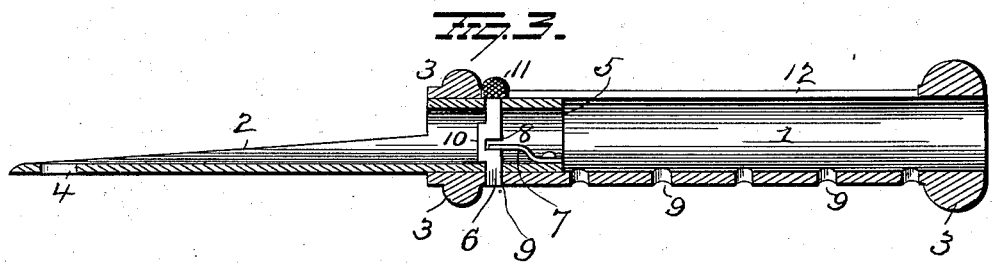
WITNESSES
INVENTOR
James J. Rogers
By H. A. Seymour
Attorney No. 743,335. Patented November 3, 1903.

UNITED STATES PATENT OFFICE.

JAMES J. ROGERS, OF LINCOLN, NEBRASKA.

PUNCH AND LACING-AWL.

SPECIFICATION forming part of Letters Patent No. 743,335, dated November 3, 1903.

Application filed March 4, 1903. Serial No. 146,146. (No model.)

*To all whom it may concern:*

Be it known that I, JAMES J. ROGERS, a resident of Lincoln, in the county of Lancaster and State of Nebraska, have invented certain new and useful Improvements in Punches and Lacing-Awls; and I do hereby declare the following to be a full, clear, and exact description of the invention, such as will enable others skilled in the art to which it appertains to make and use the same.

My invention relates to an improved punch and lacing-awl, the object of the invention being to provide improvements of this character in which the punch is adjustable in the handle and can be entirely inclosed therein or secured at any point to punch a hole of any desired size; and with this object in view the invention consists in certain novel features of construction and combinations and arrangements of parts, as will be more fully hereinafter described, and pointed out in the claims.

In the accompanying drawings, Figure 1 is a view in elevation, showing the punch inclosed in the handle. Fig. 2 is a similar view showing the punch extended, and Fig. 3 is a view in longitudinal section.

1 represents the handle, and 2 the punch or awl. The handle 1 is hollow and made with milled enlargements 3 at its ends to facilitate gripping the same.

The punch or awl 2 is a cylinder cut at an angle and sharpened at its point and sides. In other words, the punch is curved in cross-section and is tapered to a point and provided near its pointed end with an eye 4, which permits the use of the tool as a lacing-awl. The inner end of the punch comprises a complete cylinder 5 of just the proper diameter to fit snugly in handle 1 and slide therein. This cylindrical portion 5 of the punch is made with alined perforations to receive a locking pin or dog 6, and a spring 7 is secured at one end to the punch and located at its free end in a notch 8 in pin or dog 6 to normally hold the dog in any of a series of holes or perforations 9 in the handle 1. An enlargement 10 is provided on pin or dog 6 to limit its longitudinal movement, and a knob or finger-hold 11 is provided on the end of this pin or dog 6, which latter projects through an elongated slot 12 in the handle and moves therein. The knob or finger-hold 11 permits the operator to raise the pin or dog 6 out of the opening 9 in handle 1 and adjust the punch to any position, when the dog will spring into an opening 9 and securely hold it in such position.

It will be seen that with my improvements the dog or pin 6 can lock in any of the openings 9 in the handle and secure the punch projected any desired distance to cut a hole of the size wanted. For example, when the punch is extended but a short distance from the handle it can be forced through the strap or belt or other article only to the handle and when turned will cut but a small hole and will cut correspondingly larger holes according to the distance outward the punch is projected from the handle.

A great many different forms of devices may be employed to secure the punch in any position with relation to the handle and other changes might be made in the construction without departing from my invention. Hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a holder, of a punch mounted therein, said punch curved transversely and having side edges which converge from the rear end to the forward end of the punch, and means for securing said punch at different adjustments relatively to the holder.

2. The combination with a holder, of a punch having a head mounted therein, said punch curved transversely and having side edges which converge from said head to the forward end of the punch, and means for engaging said head for securing said punch at different adjustments relatively to the holder.

3. The combination with a holder having an elongated slot and a series of holes opposite said elongated slot, of a punch having a head movable in said holder, said punch curved transversely and having side edges which converge from said head to the forward end of the punch, a pin passing through the slot in the holder and through the head of the punch and entering one of the series of holes in the holder, whereby said punch can be adjusted for making holes of different sizes.

4. The combination with a holder having an elongated slot and a series of holes and a punch having a hollow head movable in said holder, of a pin passing through the slot in the holder and through said hollow head and entering one of the series of holes in the holder, a spring engaging said pin for retaining it in one of said holes, and a shoulder on said pin to engage the wall of the punch-head.

In testimony whereof I have signed this specification in the presence of two subscribing witnesses.

JAMES J. ROGERS.

Witnesses:
A. L. BOTHWELL,
F. W. WILLSON.